United States Patent
Stefanka

[11] 3,714,311
[45] Jan. 30, 1973

[54] METHOD FOR FORMING CONVOLUTED TUBING

[75] Inventor: Joseph Anthony Stefanka, North Baltimore, Ohio

[73] Assignee: Norbalt Rubber Corporation, North Baltimore, Ohio

[22] Filed: Aug. 20, 1970

[21] Appl. No.: 65,368

[52] U.S. Cl. .................264/98, 138/121, 264/150, 264/236, 264/294, 264/336, 425/326
[51] Int. Cl......B29c 17/07, B29c 17/14, B29h 17/15
[58] Field of Search.....264/DIG. 25, 94, 294, 89, 90, 264/92, 96, 98, 99, 236, 336, 347, 150, 296, 295; 138/121, 122; 425/326, 387, 388

[56] References Cited

UNITED STATES PATENTS

| 2,299,520 | 10/1942 | Yant | 264/294 |
|---|---|---|---|
| 3,313,319 | 4/1967 | Osborn | 264/94 X |
| 2,866,230 | 12/1958 | Holte | 264/DIG. 25 |
| 2,712,157 | 7/1955 | Holte | 264/DIG. 25 |
| 2,248,898 | 7/1941 | Ross | 264/DIG. 25 |

Primary Examiner—Robert F. White
Assistant Examiner—J. H. Silbaugh
Attorney—McNenny, Farrington, Pearne and Gordon

[57] ABSTRACT

A method for forming corrugated tubing. Uncured elastomeric material is extruded to form cylindrical tubing. This tubing is pressurized without curing in a separable mold causing it to plastically deform to an intermediate shape in which the tube has shallow corrugations each having a length exceeding the desired corrugation length. The tube is subsequently positioned on a mandrel and axially shortened causing the initial corrugations to plastically deform to the desired final shape in which the corrugation walls are substantially radial and the length of each corrugation approaches a length equal to the sum of the thicknesses of the corrugation walls. The material is cured while on the mandrel to complete the manufacturing operation.

5 Claims, 8 Drawing Figures

PATENTED JAN 30 1973
3,714,311
SHEET 1 OF 2
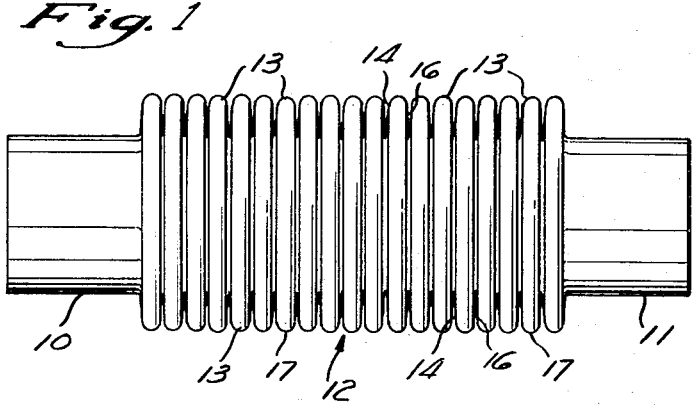
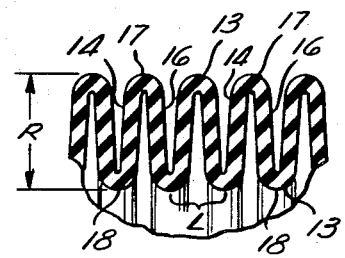
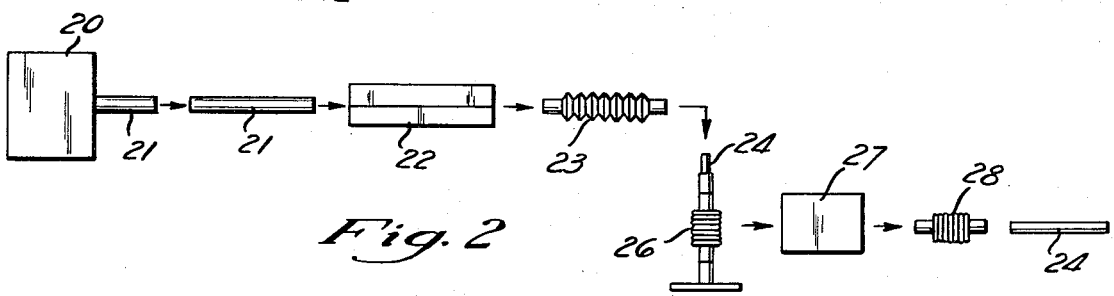
Fig. 1
Fig. 1a
Fig. 2
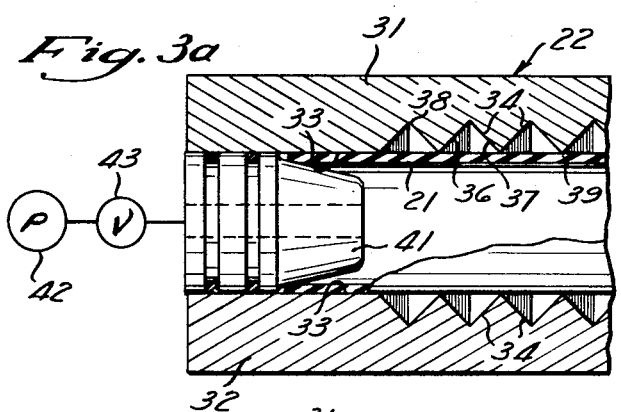
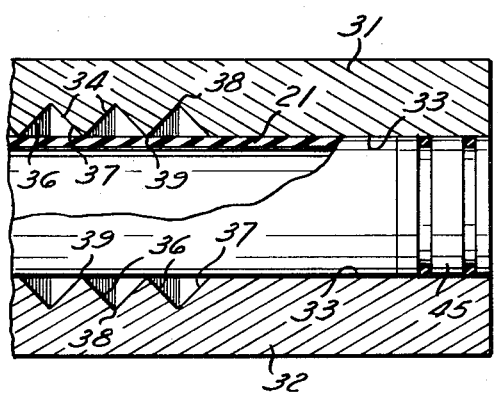
Fig. 3a
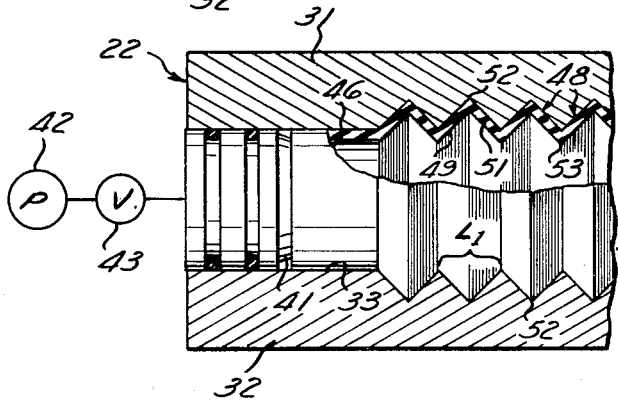
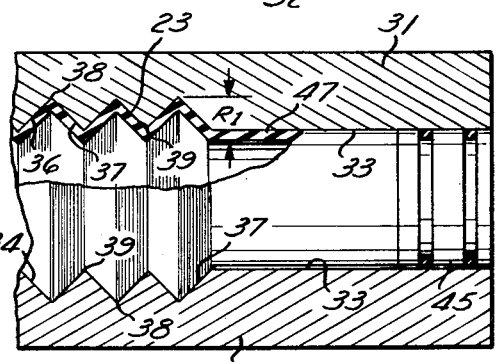
Fig. 3b
INVENTOR.
JOSEPH ANTHONY STEFANKA
BY
McNENNY, FARRINGTON, PEARNE & GORDON
ATTORNEYS

INVENTOR.
JOSEPH ANTHONY STEFANKA
BY
MCNENNY, FARRINGTON, PEARNE, & GORDON

ATTORNEYS

METHOD FOR FORMING CONVOLUTED TUBING

BACKGROUND OF THE INVENTION

This method relates to a novel and improved method for forming corrugated tubing.

Various patents disclose methods for forming corrugated tubing. For example, the U.S. Pat. Nos. 1,864,861; 2,371,991; and 3,076,737 disclose various types of tubes and methods of manufacture. In the U.S. Pat. No. 2,848,015 a tube of uncured rubber is positioned in a mold with reinforcing wire and is expanded with pressure to a corrugated shape. Subsequently, the tube material is cured to form the finished article wherein the corrugations are reinforced with wire.

In the U.S. Pat. No. 2,299,520 an unreinforced tube is formed with annular corrugations. The method of such patent involves the positioning of pieces of sheet rubber around a core within a mold wherein the mold and core cooperate to define a mold cavity having annular corrugations. Such annular corrugations have an axial length which exceeds the desired corrugation length in the finished tube. The rubber material is partially cured in such mold cavity and is then removed from the mold and core. It is believed that the partial curing is required in such method to insure that the two separate pieces of sheet rubber material are adequately bonded together and to permit the removal of the core without destroying the shape of the tube formed in the mold.

The molded tube is then placed on a mandrel and is axially shortened to shorten the corrugations to the desired length. The final curing occurs while the tube is on the mandrel.

The method of this latter patent requires the careful assembling in the mold of two separate pieces of rubber material. If insufficient material is placed in the mold, the tube may have holes or thin sections. If too much material is positioned in the mold, difficulty in closing the mold is encountered and undesirable fins are formed. Further, the partial curing in the mold requires that the rubber remain in the mold for a period of time required for partial curing. This severely limits the production capacity obtainable with a given mold. Finally, the removal of the partially cured tube from the core must be accomplished without destroying the tube and without causing permanent distortion thereof.

SUMMARY OF THE INVENTION

With the present invention the corrugated tubing tends to be more uniform and tends to have higher quality. Further, the manufacturing costs are reduced and higher production rates are achieved when compared to the general practices in the prior art.

The method involves first the forming of a cylindrical tube of uncured elastomeric material, preferably by extrusion. The cylindrical tube is then placed in a female die formed with a corrugated inner wall wherein the mold corrugations are relatively shallow and have an axial length exceeding the desired length of the finished corrugation. While the tube is in the mold it is subjected to internal fluid pressure causing the uncured material to plastically deform radially outward into the mold corrugations. During such plastic deformation, the length of the tube remains constant and the wall thickness along the corrugations decreases slightly. However, since the corrugations are shallow, excessive wall thinning does not occur.

The mold is then opened and the intermediately corrugated tube is removed. Since no curing is performed in the mold, the cycle time of the molding operation is short. Further, since no core is involved, the removal of the tube is easily accomplished.

After the tube is removed from the mold it is positioned over a smooth mandrel having an outside diameter substantially equal to the minimum internal diameter of the intermediate tube. The ends of the tube are then moved along the mandrel toward each other causing the sloping sides of the intermediate corrugations to plastically deform to a substantially radical position. This causes a substantial shortening of the corrugations to the desired length. In the illustrated embodiment the length of the corrugations is substantially equal to twice the wall thickness thereof. Because the shortening of the tube and the corrugations thereof on the mandrel occurs while the elastomeric material is in the uncured state, the deformation of the material occurring during this operation is substantially plastic in nature.

While the tubing remains on the mandrel it is subsequently fully cured thus completing the manufacture of the corrugated tubing. Because the full curing of the tube occurs while the tube is in the finished shape, the finished tube is substantially free of internal stresses which would otherwise occur if the tubing were partially cured in one shape and subsequently finally cured in another shape.

The wall thickness of the initial tube is very uniform and is free of joints or the like because it is formed by extrusion. This uniform wall thickness is maintained to a substantial degree during the subsequent molding operation since the radial stretching of the wall material is not great. Similarly, the wall thickness when the corrugations are shortened is not changed to a substantial degree since the shortening of the corrugations involves the deformation which can be considered more a type of folding rather than stretching. Consequently, the wall thickness, even in the outer extremities of the corrugations, is not substantially less than the wall thickness at the roots of the corrugations even though the corrugations provide substantial radial walls and have a length approaching twice the wall thickness.

BRIEF DESCRIPTION OF THE DRAWINGS

FIG. 1 is a side elevation of a novel and improved corrugated tube in accordance with the present invention;

FIG. 1a is an enlarged fragmentary section of the corrugated wall of the tube illustrated in FIG. 1;

FIG. 2 is a diagrammatic view illustrating the sequential steps of the preferred method of manufacture of a tube in accordance with the present invention;

FIG. 3a illustrates the molding operation wherein the cylindrical tube is positioned within the mold illustrating the tube prior to the expanding of the tube with internal pressure;

FIG. 3b is a view similar to FIG. 3a illustrating the completed molding operation wherein the intermediate tube is formed;

DETAILED DESCRIPTION OF THE DRAWINGS

Figure 4A:
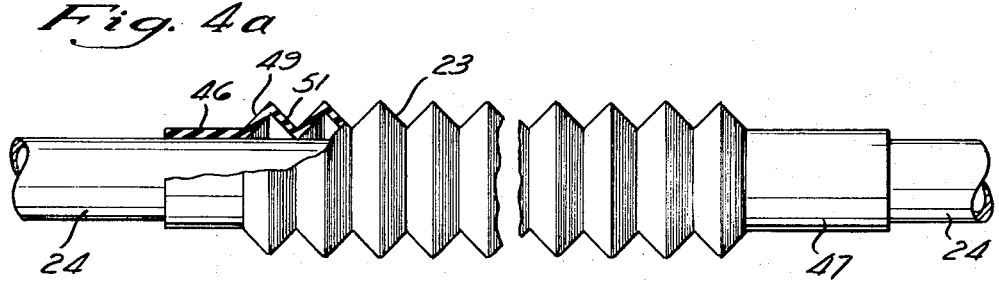
FIG. 4a illustrates the intermediate tube after it has been positioned over the mandrel but prior to shortening of the tube and its corrugations.

The preferred corrugated tube in accordance with the present invention is provided with cylindrical end portions 10 and 11 and a central corrugated portion 12 extending therebetween. The corrugated portion is formed with a plurality of annular corrugations 13 each consisting of opposed radially extending walls 14 and 16 joined together at their outer extremities by a bend section 17. The inner extremity of the wall 14 of one corrugation joins with the wall 16 of the adjacent corrugation at an inner bend section 18, excepting where each of the end corrugations joins with the adjacent cylindrical end portions 10 and 11.

Preferably, each of the bends 17 and 18 is substantially a 180° bend and the two walls 14 and 16 of each corrugation are substantially parallel. In the preferred tubing the axial length of each corrugation L is substantially equal to the sum of the thicknesses of the walls 14 and 16.

FIGS. 1 and 1a illustrate the tubing in the unstressed condition to which the tubing moves if it is not subjected to externally applied stress. Obviously, the length of tubing can be increased when an axial load is applied between the two cylindrical sections 10 and 11 and the tubing can be bent from the straight position illustrated. In the illustrated tube, the two ends 10 and 11 have an equal diameter and have substantially the same wall thickness. Similarly, the wall thicknesses of the corrugations along the two walls 14 and 16 and around the two bends 17 and 18 is substantially equal to the thickness of the cylindrical ends. It is recognized that the walls thin to some degree as they extend radially outward, but such thinning is relatively minor in amount. Also, the inner diameter of the inner bends 18 is substantially equal to the inner diameter of the two cylindrical end portions 10 and 11.

FIG. 2 diagrammatically illustrates the preferred method of manufacturing the tube illustrated in FIG. 1. An extrusion mill 20 extrudes tubing 21 which is cut to length. The thickness of the wall of the tube 21 and its diameter are substantially equal to the required thickness and diameter of the two end portions 10 and 11. From the extrusion mill a piece of tubing 21 is placed in a two-piece female die 22 having shallow corrugations along the inner die surface, as will be described in detail below. The cylindrical tube 21 is subjected to internal fluid pressure within the die 22 and is plastically deformed without curing to an intermediate corrugated shape 23. The intermediate corrugated tube is provided with cylindrical end portions and a central corrugated portion wherein the corrugations have axial lengths substantially greater than the desired axial length of the corrugations in the finished tube and the radial extent of the intermediate corrugations is substantially less than the final corrugation depth desired.

The intermediate tube 23 is then placed on a cylindrical mandrel 24 and axially shortened by moving one end toward the other until the final corrugated shape is reached as illustrated by the uncured final tube 26. While the tube remains on the mandrel 24 it is cured in a suitable manner such as in a curing oven 27 to its final condition. After curing, the final cured tube 28 is removed from the mandrel 24 completing the manufacturing process.

FIGS. 3a and 3b progressively illustrate the forming of the cylindrical tube 21 within the two-part mold 22. The mold 22 consists of two parts 31 and 32 which are normally identical in shape. Each of the mold parts 31 and 32 is formed with semi-cylindrical end portions 33 which cooperate to define a cylindrical end part of the mold having a diameter substantially equal to the outside diameter of the tube 21. Intermediate the semi-cylindrical end portions 33 each of the mold parts is provided with shallow corrugations 34 each of which provides similar inclined semi-conical walls 36 and 37 which extend to an outer intersection at 38 and which join to the adjacent semi-conical wall at an inner intersection at 39.

When the mold is closed the associated semi-conical wall surfaces of the two molds cooperate to form shallow corrugations with opposed conical sections extending at an angle of about 45° with respect to the central axis and joined at the two intersections 38 and 39. The diameter of the intersection 39 is preferably substantially equal to the outer diameter of the tube 21 and, of course, the diameter 38 is greater than the diameter of the tube 21.

After the tube is placed in the mold 22 and the mold is closed, the interior of the tube 21 is pressurized through a fitting 41 which forms a seal with the inner surface of the tube 21 at one end. Preferably, the pressurization is provided by air supplied from a pump 42 connected through a valve 43. However, water under pressure or other fluids may be used as desired. The opposite end of the mold is closed by a plug 45 which also seals with the other end of the tube. Venting of air in the corrugations and of any slight leakage which may occur, occurs along the part line between the two mold parts 31 and 32.

The pressurization of the interior of the tube 21 causes the tube to plastically deform to the condition illustrated in FIG. 3b. Such plastic deformation involves a radial stretching of the tube until it conforms to the corrugations formed in the mold. Consequently, the tube after pressurization provides two end portions 46 and 47 which remain with a cylindrical shape with the diameter substantially the same as the original diameter of the tube 21. However, intermediate the two cylindrical end portions 46 and 47 the tube is provided with shallow corrugations 48, each of which includes a conical surface 49 and 51. The outer extremities of the conical portions 49 and 51 of each corrugation are joined at 52 and the inner extremities are joined to the adjacent part of the adjacent corrugation at the intersection 53. It should be understood that the axial length $L_1$ of the corrugations of the intermediate tube 23 is substantially greater than the length L of the corrugation desired in the final product. Further, the radial height $R_1$ is substantially less than the final radial height R of the final tube. The wall thickness along the corrugations is not appreciably reduced due to the radial stretching of the material since the corrugations in the mold are relatively shallow. Consequently, the wall thickness of the intermediate tube 23 is substantially uniform. The corners at 38 and 39 are preferably relatively sharp so that a hinge line will be formed along which the material tends to fold during the subsequent operation.

The pressure need only be applied to the mold for a few seconds to cause the required plastic deformation to produce the intermediate tube 23 since no curing is involved in this operation. As soon as the pressure is released, the mold is opened and the intermediate tube 23 is easily removed.

Figure 4B:
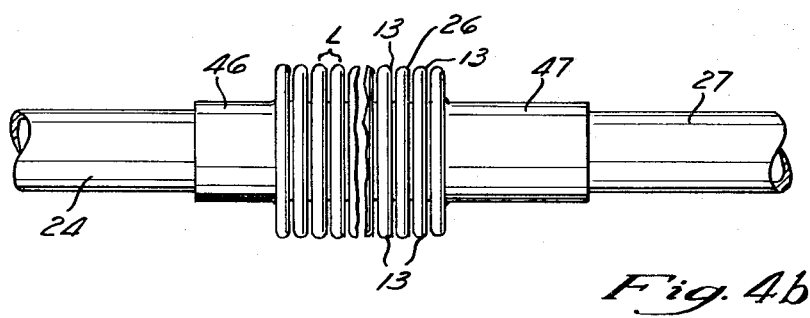
FIG. 4b illustrates the tube on the mandrel after its length is shortened to the desired final length.

The tube 23 is then progressively formed to its final shape as illustrated in FIGS. 4a and 4b. First, the intermediate tube 23 is positioned on a mandrel 24 by merely sliding the intermediate tube over the end of the mandrel as illustrated in FIG. 4a. The mandrel 24 is provided with a smooth exterior cylindrical surface having a diameter slightly less than the inner diameter of the end portions 46 and 47. This diameter is also preferably slightly smaller than the inner diameter at the intersection 53 between the two conical wall portions so that the mandrel can be easily inserted into the intermediate tube.

After the mandrel 24 extends through the tube the two ends 46 and 47 are moved toward each other to axially shorten the tube and cause the corrugations 13 to be shortened to the desired final length L. Preferably, this condition is reached when corrugations are shortened a sufficient amount so that the walls 14 and 16 are substantially radial and are substantially abutted on opposite sides by the adjacent walls. Preferably, the material of the intermediate tube is thinned slightly at the crests and roots of the corrugations to form a hinge line about which the walls 49 and 51 tend to fold when the tube is shortened. Obviously, such thinning must not be excessive since a zone of weakness would result.

During such axial shortening of the tube the radial height of the corrugations is increased from $R_1$ to $R$ and the material of the walls 14 and 16 is required to stretch outwardly to some extent causing a limited amount of thinning of these walls in the outer portions thereof. The mandrel 24 prevents the corrugations from deforming inwardly to any material degree so the inner diameter of the root portions of the corrugations remain substantially equal to the inner diameter of the end portions 10 and 11. In practice it has been found that the wall thickness of the corrugations and the thickness at the the bends remains substantially uniform even during this shortening of the tube and that the final corrugations are not appreciably thinned adjacent to their outer extremities.

After the tubing is shortened to its final shape on the mandrel 24, the tubing is cured in any suitable manner. When the material forming the tubing is an elastomer such as rubber, this curing usually involves heat and pressure.

Figure 5:
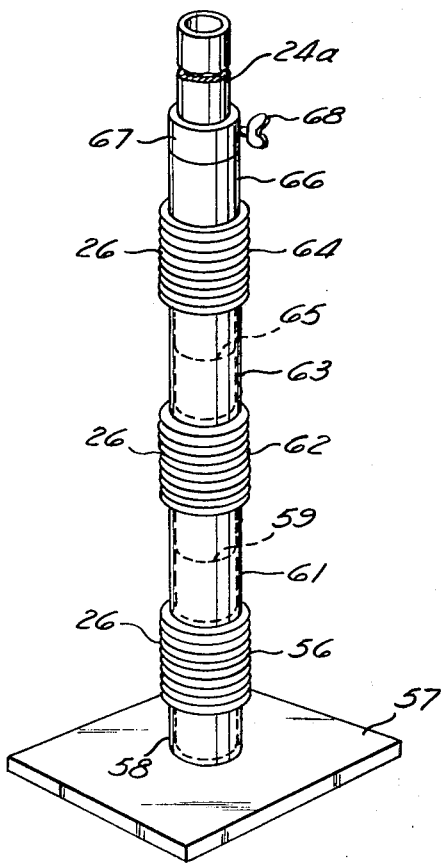
FIG. 5 illustrates one preferred mandrel structure on which a plurality of individual tubes are positioned for curing with end retainers in position.

FIG. 5 illustrates a preferred mandrel arrangement which may be used to increase the production rate by permitting the positioning of a plurality of tubes on a single mandrel. The mandrel 24a illustrated in FIG. 5 has sufficient length to accommodate three tubes 26 after the tubes are shortened. The assembly of the tubes on the mandrel is preferably performed in the following manner. The first tube 56 is positioned over the mandrel with its lower end abutting a base plate 57. A ring 58 is loosely positioned around the lower end to prevent it from buldging outward. The other end of the tube 56 is pushed along the mandrel 24a to shorten the tube 56 to its final length. When this is completed the other end is located at 59.

A loose metallic ring 61 is then positioned over the end at 59 and the next tube 62 is positioned on the mandrel and moved along the mandrel until its lower end extends into the ring 61 and engages the adjacent end of the tube 56. The loose ring 61 prevents any substantial radial expansion of the two ends and insures that the two ends will abut rather than slide one over the other. Preferably, the ring 61 has a length approximately the length of the adjacent two cylindrical portions. The opposite end of the tube 62 is then moved along the mandrel 24a until the second tube 62 has the desired length. A second loose ring 63 is then positioned over the end of the second tube 62.

Subsequently, a third tube 64 is positioned over the mandrel with its lower end inside of the second tube 63 in engagement with the end at 65. Preferably, the mandrel has sufficient length so that the third tube 64 can be positioned completely over the mandrel before its length is shortened. The third tube is then shortened and its opposite end is surrounded by a ring 66. A lock ring 67 is then positioned and locked by a wing screw 68. The three tubes 56, 62, and 64 are then simultaneously cured by placing the mandrel 24a with the tubes thereon in the curing oven 27 such as an autoclave. It should be recognized that mandrels having sufficient length to accommodate greater or lesser numbers of tubes may be used and that the mandrel 24a is only illustrated by way of example of one mandrel arrangement which may be used. After curing the lock ring 67 is removed and the tubes are freely pulled off of the end of the mandrel completing the manufacturing process.

Although it is contemplated that the material used to form the tubing will generally be a rubber or elastomer type, this invention, in its broader aspects, is applicable for use in forming corrugated tubing from other materials such as a thermosetting plastic or other types of settable plastics. In fact, the invention is applicable in some of its broader aspects to thermosoftening materials. With such latter materials the operations are performed at temperatures which are sufficiently elevated to permit easy plastic deformation and the material is set by allowing it to cool. In any event the material should be sufficiently stable, in its uncured or unset condition, to permit it to be handled without excessive care and without excessive deformation; but also be sufficiently unstable to permit it to be easily plastically deformed to its final shape. Further, it should be settable either by curing or otherwise so that it becomes sufficiently stable in the final shape for its intended use.

Because the forming of the intermediate tube 23 is achieved without any curing, the cycle time of molding with the mold 22 is relatively short and high production rates can be achieved. Also, the use of an extruded tube having a very uniform wall thickness without joints or the like improves product uniformity, eliminates the possibility of fins due to excessive filling of the mold, and permits the tube to be inserted and removed from the mold easily. Even when substantial production rates require the use of a number of separate mandrels the expense involved is not great. Finally, since the entire curing is performed after the corrugations are held in the final desired shape internal stresses within the material of the tube itself are minimized and an improved product is obtained.

Although a preferred embodiment of this invention is illustrated, it is to be understood that various modifications and rearrangements may be resorted to without departing from the scope of the invention disclosed and claimed herein.

What is claimed is:

1. A method of forming corrugated tubing comprising extruding a cylindrical tube of uncured plastically deformable elastomeric material having a substantially uniform cross section, cutting said tube into pieces of tubing having a predetermined length, enclosing a piece of tubing in a separable female mold formed with extended shallow convolutions, forming a fluid-tight joint at the ends of said tubing and pressurizing the interior thereof for a period of time in the order of a few seconds causing it to expand by plastic deformation to fill said mold thereby forming an uncured intermediate corrugated tube of said predetermined length, said intermediate tube having shallow convolutions with opposed faces extending at an angle of about 45° with respect to the center axis of said intermediate tube, promptly removing said intermediate tube from said mold after release of said pressure without substantial deformation and without curing thereof, and positioning said intermediate uncured tube on a separate support while axially shortening said tube on said support to the required length of the finished tube, said shortening of said tube causing further plastic deformation and substantially increasing the radial extent while decreasing the axial extent of said convolutions as the length of the tube is shortened until the walls of said convolutions are substantially radial and their length approaches two times the wall thickness has been inserted, and positioning said support with said tube thereon in a curing device for curing said material while it is in the final shape required.

2. A method of forming corrugated tubing as set forth in claim 1 wherein the mold is shaped so that the minimum diameter of said intermediate corrugated tube is at least substantially equal to the minimum diameter of said extruded tubing, and said support is a smooth elongated element sized to receive said intermediate tube and prevent substantial radial contraction of said convolutions as said intermediate tube is shortened.

3. A method of forming corrugated tubing as set forth in claim 2 wherein said support is a cylindrical tube.

4. A method of forming corrugated tubing as set forth in claim 1 wherein said intermediate tube is provided with cylindrical ends and said cylindrical ends are radially supported both inside and outside while said tube is supported on said support and cured.

5. A method of forming corrugated tubing as set forth in claim 4 wherein rigid sleeves are positioned around said cylindrical ends and engage the adjacent shallow convolution as said intermediate tube is shortened so that the axial loads for shortening said tube is not applied to said cylindrical ends.

* * * * *